April 14, 1936.  G. C. HORTON  2,037,131
HAY PRESS
Filed April 13, 1934    4 Sheets-Sheet 1
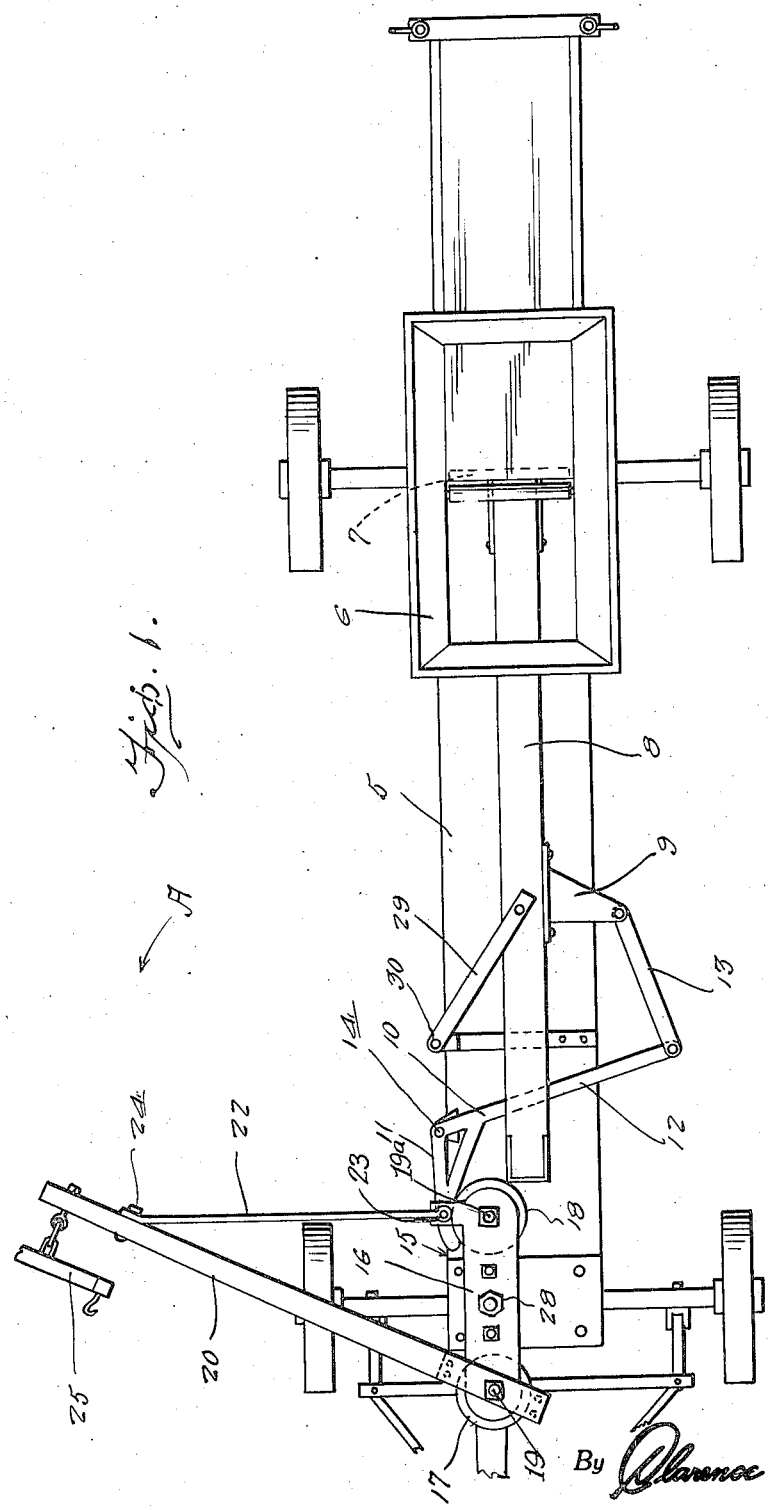
Inventor
G. C. Horton
By Clarence A. O'Brien
Attorney

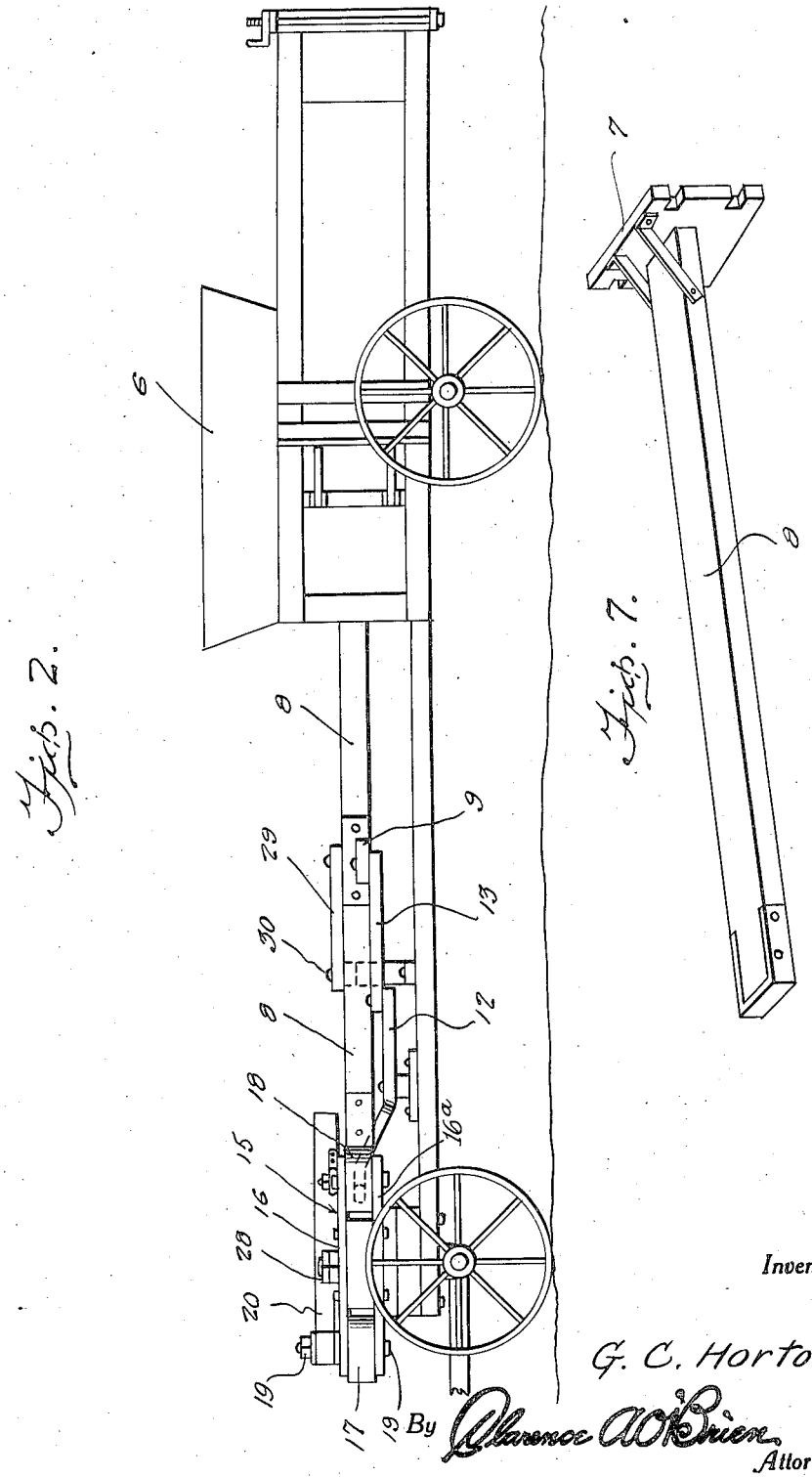

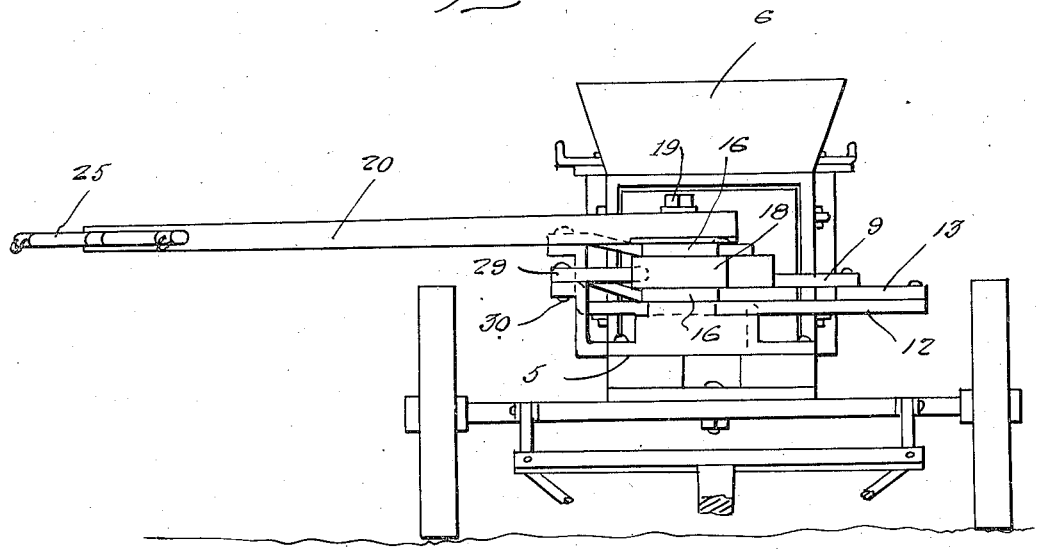
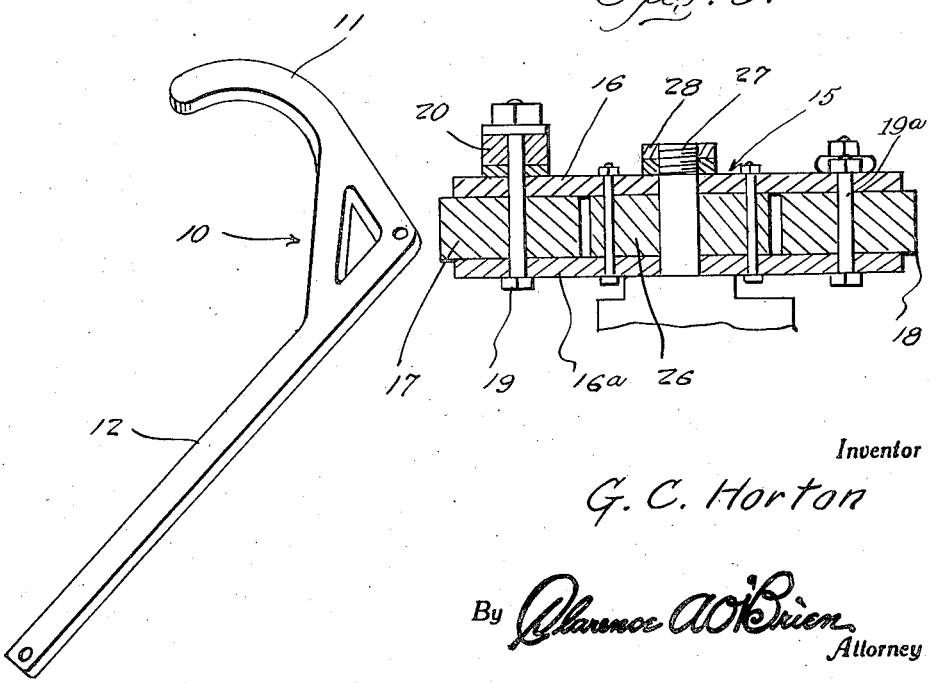

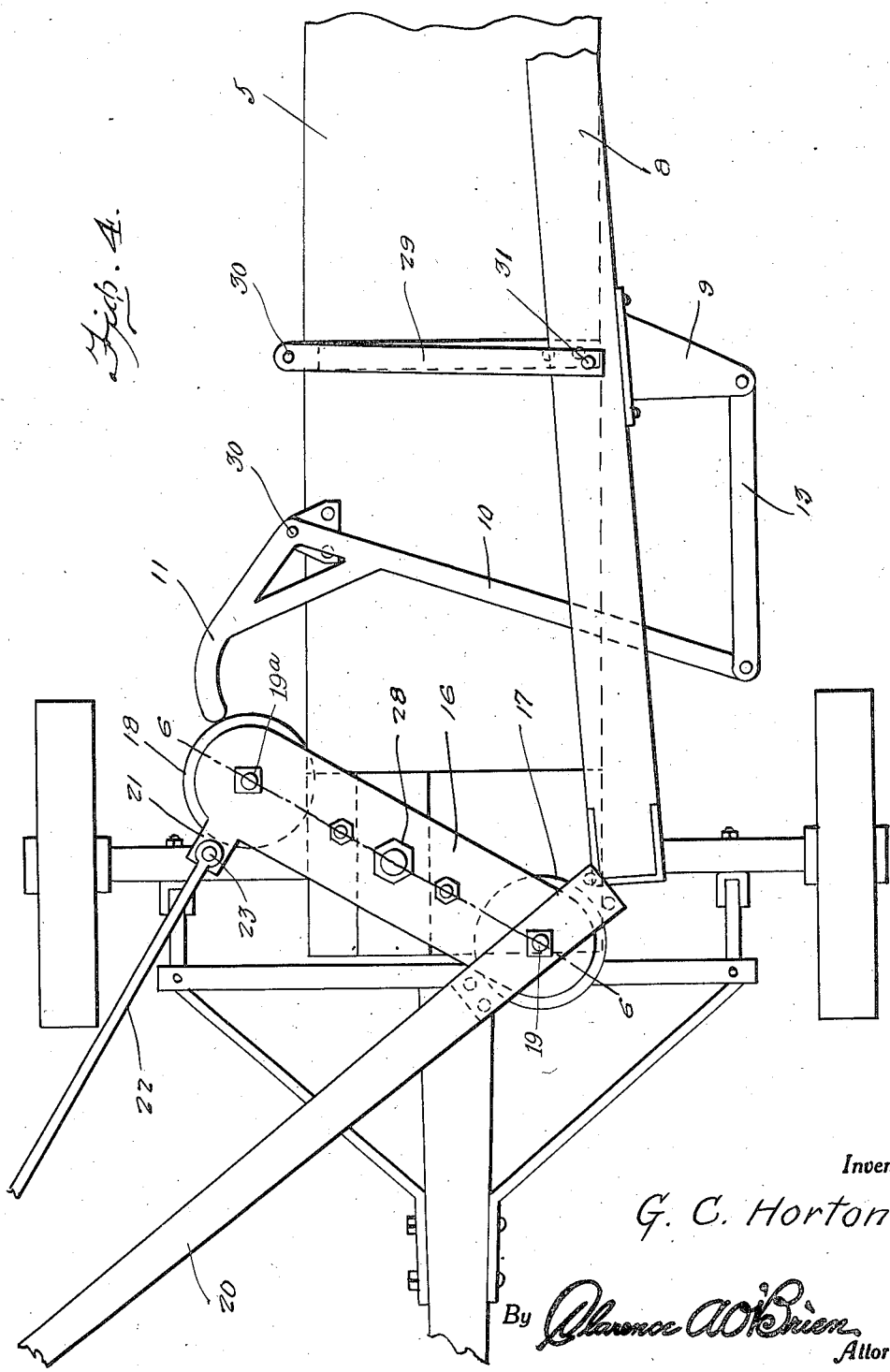

Patented Apr. 14, 1936

2,037,131

UNITED STATES PATENT OFFICE 2,037,131

HAY PRESS

Grover C. Horton, Oneonta, Ala.

Application April 13, 1934, Serial No. 720,468

1 Claim. (Cl. 100—7)

This invention appertains to new and useful improvements in hay presses, and more particularly to hay presses of the type operated by draft animals in the field.

The principal object of the present invention is to provide a hay press of the type stated wherein two strokes of the press plunger will be executed during one direction of travel of the animal employed.

Another important object of the present invention is to provide a hay press which in operation will be positive acting and not readily susceptible to the development of defects.

These and various other important objects and advantages of the invention will become apparent to the reader of the following specification.

In the drawings:

Figure 1 represents a top plan view of the press, with the draft beam at the position beginning the first retractile movement of the press plunger.

Figure 2 represents a side elevational view of the press.

Figure 3 represents a front end elevational view of the press.

Figure 4 represents an enlarged fragmentary top plan view of the press operating means, showing the beam in a position about to cause a compressing stroke of the plunger.

Figure 5 represents a perspective view of the rocker.

Figure 6 represents a sectional view taken substantially on line 6—6 of Figure 4.

Figure 7 represents a perspective view of the plunger.

Referring to the drawings wherein like numerals designate like parts, it can be seen in Figure 1 that numeral 5 represents the elongated platform upon one end portion of which is mounted the press box 6 and in which the plunger 7 operates. Numeral 8 represents the elongated plunger bar which extends forwardly along the platform 5 and has the bracket 9 secured to one side thereof adjacent its forward end portion.

Numeral 10 represents a rocker unit consisting of the short arcuate leg portion 11 and the elongated arm 12. A pivotal link 13 connects the outer end of the arm 12 to the bracket 9, while the rocker is supported on the pivot 14 suitably mounted upon the platform 5.

At the forward end of the platform 5 is a swingable assembly, generally referred to by numeral 15 and the same consists of a pair of plates 16—16a between the ends of which are mounted the rollers 17—18. A bolt 19 extends through one of these rollers and also through the draft beam 20 at its inner end. Bolt 19a supports the other roller 18. A lug 21 at the opposite end of the top plate 16 from the draft beam connection has the elongated rod 22 pivotally connected thereto, as at 23, while its outer end connects to the outer end portion of the draft beam 20, as at 24. The animal singletree or doubletree equipment 25 is suitably connected to the outer end of the beam 20. A block 26 is provided between the intermediate portions of the plates 16—16a and a spindle 27 extends upwardly from the platform through the intermediate portions of the plates and the block 26 and is provided with nuts 28 at its upper end. Thus the assembly 15 is rotatably mounted upon the forward end of the platform, it being observed in Figure 4 that the inner end of the beam 20 projects slightly beyond the adjacent roller 17 so that it is capable of abutting the adjacent end of the push bar 8. The curved leg portion 11 of the rocker 10 is also capable of being in the path of the rollers to an extent which will be described hereinafter.

An arm 29 is swingably supported, as at 30, on the platform 5, while its opposite end is pivotally connected, as at 31, to the bar 8 so as to hold the bar within certain confines of motion.

It will be seen that an important object of the machine is to cause two strokes of the plunger 7 during the travel of the animal in one direction. Thus it can be seen that with the animal starting at approximately the arrow A in Figure 1, a stroke of the plunger is accomplished by the roller 18 driving against the end of the push bar 8.

As the beam reaches the position shown in Figure 1 in full lines, the roller 18 is engaging the arcuate leg 11 and by continuing the pull on the beam 20, the rocker 10 will be rocked so that the bar 8 will be retracted and the plunger 7 pulled away from the hay. As the animal continues, the roller 18 will leave the leg 11, as shown in Figure 4, and the roller 17 will approach and engage the bar 8 to repeat the operation of pushing the bar and causing compression of hay in the box 6. Obviously, the roller 17 will move up and engage the leg 11 and cause retraction of the bar 8 before the animal is reversing his direction of travel, so that the plunger 7 will be in position for the baling stroke at the animal's next outset of travel.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

In a hay press, a platform, a press box on the platform, a plunger operative in the box, a bar extending from the plunger, a rotatable member mounted on the platform at the outer end of the plunger bar, a draft beam projecting laterally from the rotatable member, a bell crank rockably supported on the platform, a pivotal link between one end of the bell crank and the plunger bar, the other end of the bell crank being engageable by the ends of the rotatable member, said plunger bar having its outer end in the path of the end portions of the said rotatable member, and a link member, one end of the link being pivotally connected to the said platform, and the other end of the link member being pivotally connected to the plunger.

GROVER C. HORTON.